May 29, 1923.  1,457,120

C. L. MADDEN

SPOTLIGHT

Filed July 27, 1920

Charles L. Madden INVENTOR

BY

Geo. B. Willcox. ATTORNEY

Patented May 29, 1923.

1,457,120

UNITED STATES PATENT OFFICE.

CHARLES LOUIS MADDEN, OF BAY CITY, MICHIGAN.

SPOTLIGHT.

Application filed July 27, 1920. Serial No. 399,320.

*To all whom it may concern:*

Be it known that I, CHARLES L. MADDEN, a citizen of the United States, residing at Bay City, in the county of Bay and State of Michigan, have invented certain new and useful Improvements in Spotlights; and I do hereby declare the following to be a full, clear, and exact description of the invention, such as will enable others skilled in the art to which it appertains to make and use the same.

This invention relates to search lights and pertains more particularly to search lights adapted for use on closed automobiles or other vehicles.

The objects of my invention are to provide a simple and relatively inexpensive search light adapted to be located outside a vehicle, as a closed automobile, either at the side of the car, or on the roof, as may be desired, and capable of being actuated from within the car, to direct the light in any desired direction, as up, down, or sidewise.

A further object of my invention is to provide a means for operating the search light and changing its direction, said means comprising a combined swiveled support for turning the light in one plane and a longitudinally movable bar for turning the light in the other plane, said bar serving as a handle by which to turn the light, and also as a means for turning the swiveled support and for tilting the light with respect to said support.

With the foregoing and certain other objects in view which will appear later in the specification, my invention comprises the devices herein described and claimed and the equivalents thereof.

In the drawings, Fig. 1 is a side elevation of a search light embodying my improvement.

1 indicates the top, or side, of the vehicle, to which my device may be attached. 2 is a base or standard secured to the body of the vehicle.

Swiveled to the base is a bracket 3 having angularly disposed branching arms 4 pivoted to the sides of the search light body 5 by means of pivots 6 located at one side of the axial line of said base.

Figure 4:
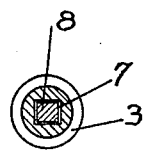
Fig. 4 is a sectional view, taken on the line 6—6 of Fig. 1.

The central bore of the hub of bracket 3 is preferably rectangular in form, as shown at 7 in Fig. 4, and the longitudinally movable rod 8, which is also preferably rectangular in cross section, is arranged to slide therein. The inner end of the rod carries a handle 9, by which the rod may move in or out, and by which the rod may be turned, thereby also turning bracket 3 and swinging the search light through an angle.

To the outer end of rod 8 is pivoted a link 10, the upper end of this link being preferably secured to a projection 11, fixed to the search light body 5.

Figure 1:
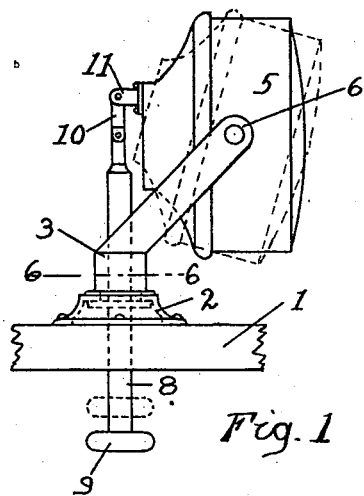
Figure 2:
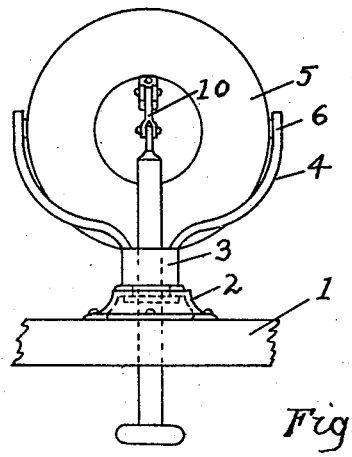
Fig. 2 is a rear view.

Thus when handle 9 is drawn in or out, the search light will be tilted as shown by the dotted lines in Fig. 1.

Figure 3:
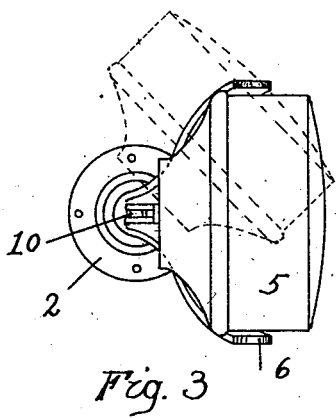
Fig. 3 is a top plan view.

By this means the handle 9 controls the tilting of the light in a vertical plane and also swings it in a plane at right angles thereto, as indicated by dotted lines in Fig. 3, whereby the search light may be directed at any point desired.

My improved construction enables the height of the standard and lamp, that is, the distance from the base to the top of the lamp, to be made a minimum, while permitting a maximum of up-and-down movement or tilting of the lamp itself. The standard has few parts and is not complicated. It is cheap to manufacture and positive in its action.

By the means above described, I have produced a simple and inexpensive device for manipulating a searchlight on the outside of a vehicle, whereby the light can be turned in any desired direction by means of a single handle, the rotating of the handle turning the light in one plane and the longitudinal movement of the handle turning the light in the other direction.

Having thus described my invention, what I claim and desire to secure by Letters Patent is:

In combination, a centrally apertured base, a pair of angularly disposed branching arms revolvably mounted on said base, a lamp case horizontally pivoted at its sides between the ends of said arms, said pivoted connection being laterally offset with respect to the axial line of said base, a rearward projection on the back wall of said lamp case, a rod longitudinally slidable in the aperture of said base and in substantial alignment with the outer end of said projection, a link pivotally connected at its lower end to the upper end of said rod and pivoted at its upper end to the outer end of said projection.

In testimony whereof, I affix my signature in presence of two witnesses.

CHARLES LOUIS MADDEN.

Witnesses:
JOHN T. HEWITT,
LENA F. SCHRAMM.